United States Patent [19]
Close

[11] Patent Number: 4,595,915
[45] Date of Patent: Jun. 17, 1986

[54] ELECTRONIC SURVEILLANCE SYSTEM EMPLOYING THE DOPPLER EFFECT

[75] Inventor: Leo R. Close, Sepulveda, Calif.
[73] Assignee: Mrs. Lawrence Israel, Van Nuys, Calif.
[21] Appl. No.: 577,583
[22] Filed: Feb. 6, 1984
[51] Int. Cl.$^4$ .............................................. G08B 13/14
[52] U.S. Cl. ..................................... 340/572; 340/554
[58] Field of Search ................ 340/571, 572, 568, 522, 340/552, 553, 554

[56] References Cited

U.S. PATENT DOCUMENTS

| | | | |
|---|---|---|---|
| 3,493,955 | 2/1970 | Minasy | 340/572 |
| 3,863,244 | 1/1975 | Lichtblau | 340/572 |
| 4,117,466 | 9/1978 | Lichtblau | 340/501 |
| 4,206,453 | 6/1980 | Williamson | 340/572 |
| 4,212,002 | 7/1980 | Williamson | 340/572 |
| 4,274,089 | 6/1981 | Giles | 340/572 |
| 4,281,321 | 7/1981 | Narlow et al. | 340/572 |
| 4,302,846 | 11/1981 | Stephen et al. | 455/19 |
| 4,303,910 | 12/1981 | McCann | 340/572 |

OTHER PUBLICATIONS

Skolnik, *Introduction to Radar Systems*, McGraw-Hill Book Co., 2nd ed., 1980, pp. 68-98.

Primary Examiner—James L. Rowland
Assistant Examiner—Jeffery A. Hofsass
Attorney, Agent, or Firm—Fraser and Bogucki

[57] ABSTRACT

A coherent frequency, velocity responsive electronic surveillance system detects the motion of a transponder relative to two receiving antennas on opposite ends of a surveillance zone positioned at the exit of a retail store. Motion in opposite directions relative to the two antennas indicates that the transponder is within the surveillance zone. As a means of reducing false alarms, motion of a transponder proximate to, but outside the zone is distinguished from motion inside the zone because motion outside the zone is in the same direction relative to both antennas. False alarms are reduced even further by requiring detection of motion through a selected distance before indicating an alarm.

12 Claims, 15 Drawing Figures

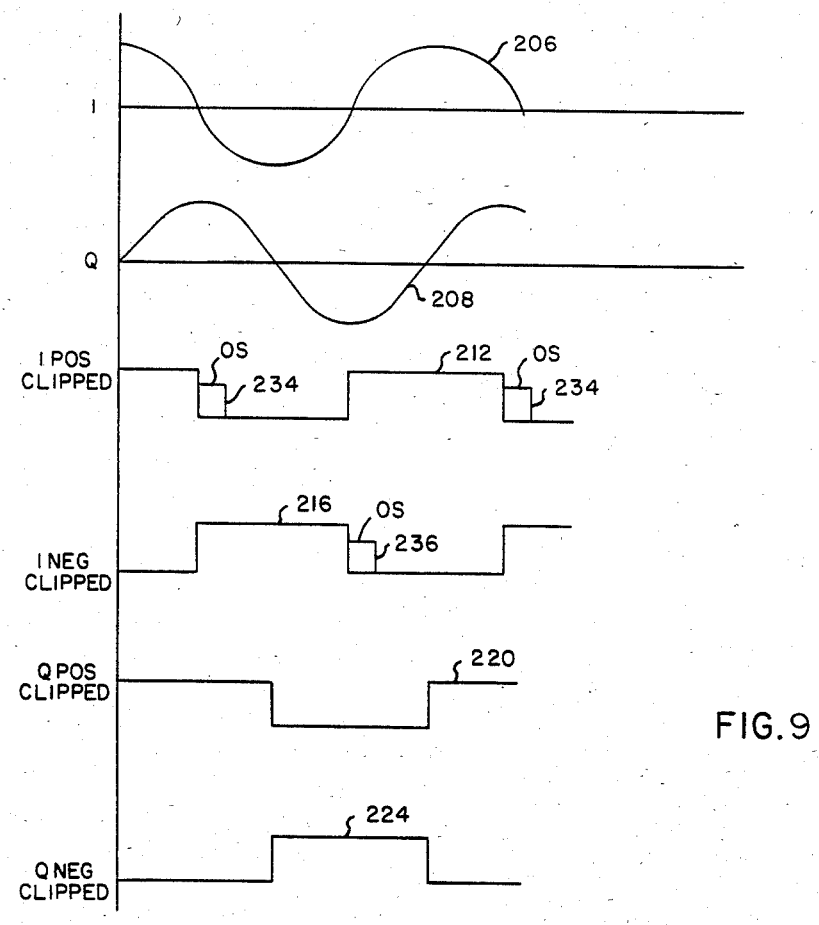
FIG. 9
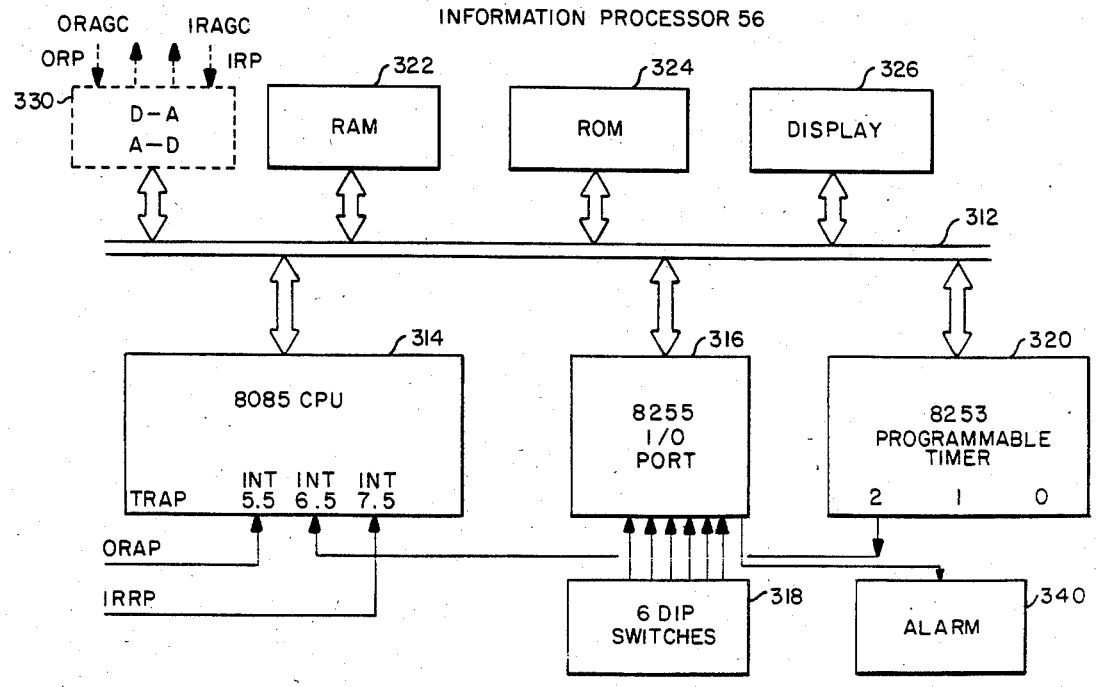

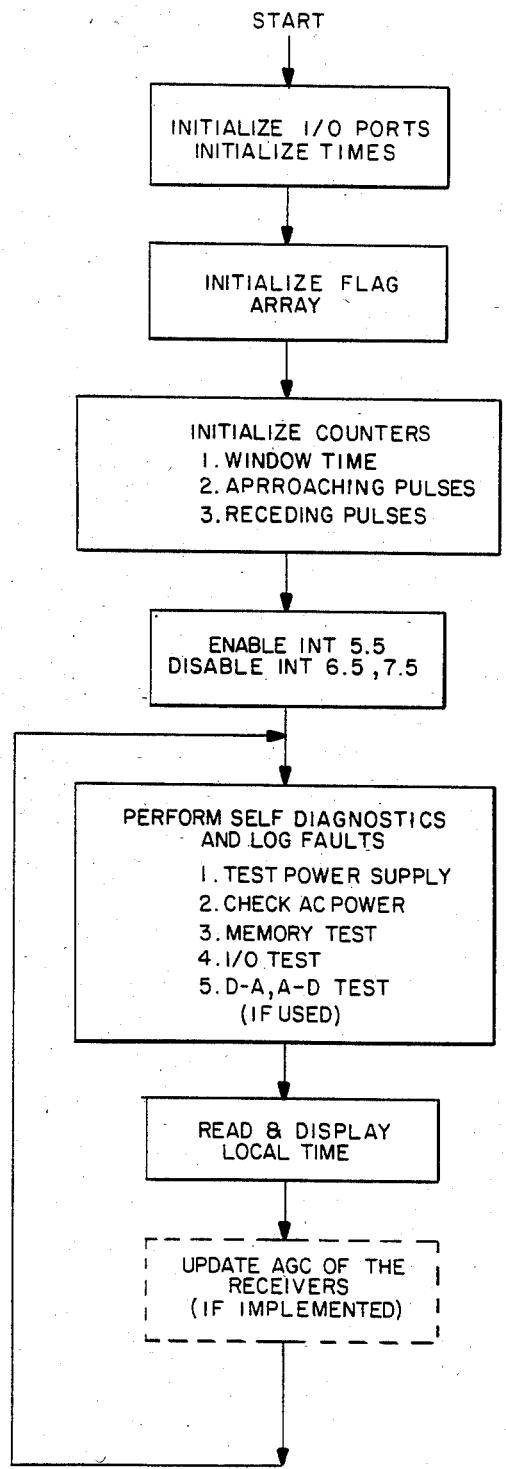
FIG.II
MAIN PROGRAM

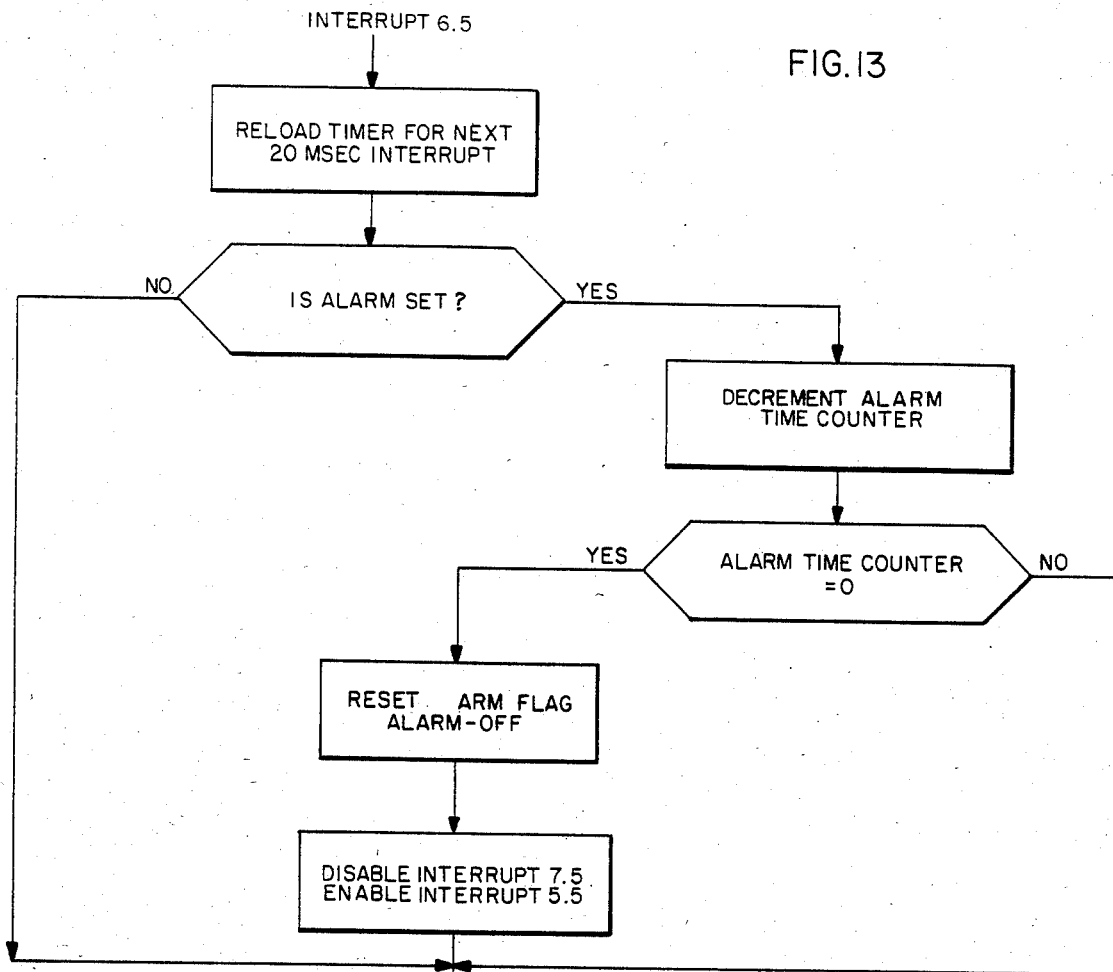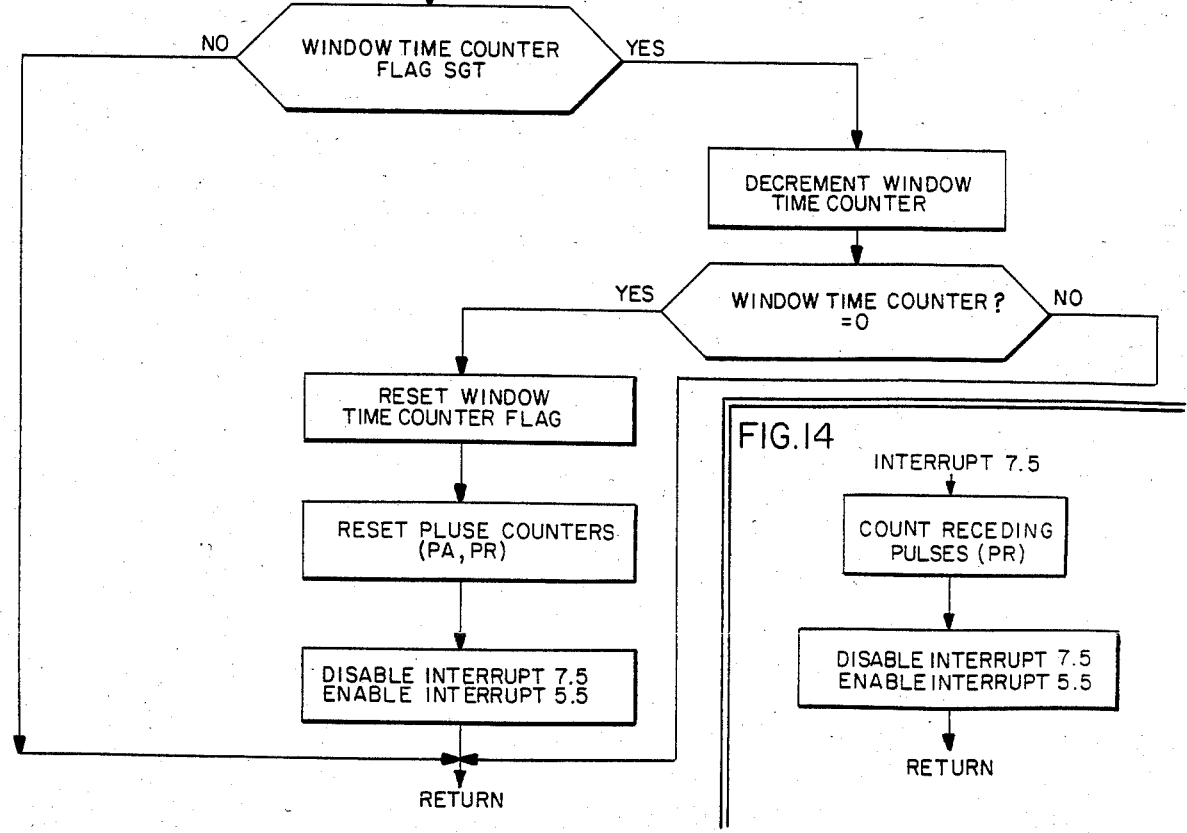
FIG. 13
FIG. 14

DOPPLER SURVEILLANCE SYSTEM 1500

ELECTRONIC SURVEILLANCE SYSTEM EMPLOYING THE DOPPLER EFFECT

CROSS REFERENCE TO RELATED APPLICATION

This application is related to application Ser. No. 577,348, filed 2/6/84, for "RANGE LIMITED COHERENT FREQUENCY DOPPLER SURVEILLANCE SYSTEM", by Leo R. Close and to application Ser. No. 501,881, filed June 7, 1983, for "PNEUMATICALLY RELEASABLE TAMPER-RESISTANT SECURITY TAG" by Leo R. Close.

BACKGROUND OF THE INVENTION

1. Field of the Invention

This invention relates to surveillance systems and more particularly to a doppler effect, coherent frequency, velocity responsive electronic surveillance system for detecting the presence of a transponder tag within the entryway of a business establishment.

2. Discussion of the Prior Art

Theft from business establishments has long been a serious and growing problem. This has been particularly true for retail establishments such as clothing stores where the trend has been to make merchandise readily accessible and to encourage self-service by the customers. While encouraging purchases and reducing labor costs, such merchandising techniques have had the undesirable effect of reducing the barriers to theft.

A known technique for discouraging theft of merchandise is to place on each merchandise item a transponder tag which receives and reradiates radio frequency electromagnetic signals. Detector systems are placed at each exit to sound an alarm whenever an active transponder tag approaches the exit. An alarm thus sounds whenever an attempt is made to carry stolen merchandise through an exit. The alarm does not sound for lawful customers because when a customer pays for selected merchandise the sales clerk uses a special tool or key to either render the transponder inactive or to remove the transponder for reuse on another item of merchandise.

The transponder can be as simple as a flat metal strip in the shape of an open loop bridged by a nonlinear circuit device such as a diode. The nonlinear circuit device causes the transponder to modulate incident waves and reradiate the sums and harmonics of the incident waves. Such a device can be enclosed within a plastic housing which is affixed to merchandise items and removed only with a special tool.

Such surveillance systems have proven highly effective in reducing theft. Experience has shown, however, that the deterrent effect of such systems derives more from the knowledge among shoppers that such a system is in place than from the ability of such a system to reliably detect theft. In fact, many of the systems presently in use are more likely to indicate a false alarm than the presence of a pilferer and store personnel often reduce the sensitivity of the system in an attempt to eliminate the false alarms. The result is that the system often fails to respond to the presence of a transponder tag when it should.

Moreover, because most surveillance systems operate on a proximity principle which causes a detector to indicate an alarm when a transponder comes close enough to reradiate a signal having a strength greater than a threshold value, care must be taken to keep merchandise a considerable distance from the store exits. Not only does this waste valuable floor space near the store exits, but an alarm will be sounded any time a customer carries a tagged item near a store exit even if there is no attempt to steal the item. Such false alarms become en embarrassment to both customers and the store proprietor and can rapidly destroy customer goodwill.

Many examples of surveillance systems can be found in the prior art. Thus, U.S. Pat. No. 4,281,321 (Narlow et al) discloses a surveillance system in which the sum of a high frequency carrier signal and a lower frequency modulating signal produced by a floor mat is detected.

U.S. Pat. No. 4,274,089 (Giles) discloses a surveillance system in which harmonics of one signal are detected instead of the sum of two signals.

U.S. Pat. No. 4,303,910 (McCann) teaches an arrangement in which a transponder tag can be excited by an incident signal at a first frequency to cause resonance and reradiation of a return signal at a second frequency. False alarms are reduced by requiring the transponder to respond simultaneously to two different incident signals radiated by different antennas on opposite sides of a surveillance zone.

U.S. Pat. Nos. 4,212,002 and 4,206,453, both to Williamson, disclose a surveillance system in which a large area is radiated with a signal of a first frequency and smaller control areas within the large area are radiated with signals of second and third frequencies which define boundaries of the smaller control zones. Detection of transponder signals reflecting all of the transmitted signals indicates the presence of the transponder within the control zone.

U.S. Pat. No. 4,117,466 (Lichtblau) teaches an arrangement in which false alarms are reduced by detecting noise interference from an interfering transmitter and inhibiting the generation of an alarm during the presence of such noise interference.

U.S. Pat. No. 3,863,244 (Lichtblau) discloses a surveillance system using an incident transmitter which sweeps through a range of frequencies and transponders which are excited by more than one frequency. An alarm is indicated only when a transponder is excited at each of its different frequencies.

U.S. Pat. No. 3,493,955 (Minasy) teaches another arrangement utilizing a transponder which resonates at a second frequency when excited by incident signals transmitted at a first frequency. A detector circuit responds to signals at the second frequency.

Skolnik, Merrill I., *Introduction to Radar Systems,* McGraw-Hill Book Company, 2nd Ed. 1980, discloses at pages 68–98 a doppler shift CW radar system using a quadrature phase doppler detector to detect both the magnitude and polarity of motion induced doppler frequency shifts in a received radar signal.

Last, U.S. Pat. No. 4,302,846 (Stephen et al.) discloses a particular transponder arrangement including a nonlinear coupling element.

SUMMARY OF THE INVENTION

In accordance with one specific, exemplary embodiment of the invention, there is provided a frequency coherent, doppler effect surveillance system for detecting motion of a frequency changing transponder within a surveillance zone which includes a transmitting system coupled to radiate the zone with a double sideband, suppressed carrier, amplitude modulated signal, a coherent signal generating circuit for generating signals with fixed frequency at phase relationships to a master reference signal and a coherent, doppler effect receiving system. The receiving system includes, first, inner and outer receiving antennas disposed on opposite ends of the surveillance zone and adapted to receive from a transponder within the zone a frequency shifted doppler signal indicating motion of the transponder relative to the receiving antennas, and second, inner and outer receiver channels coupled to process signals received from the inner and outer antennas, respectively, to generate inner and outer motion information indicative of transponder motion. An information processor is coupled to receive and process the inner and outer motion information to generate an alarm indicator signal when the motion information indicates motion of the transponder in opposite directions relative to the inner and outer receiving antennas, for example, toward the outside antenna and away from the inner antenna.

Such an arrangement greatly reduces false alarms by requiring the presence of a transponder not merely in the vicinity of a detector, but physically between two receiving antennas of a detector system. This permits the establishment of a surveillance zone having precise boundaries thereby avoiding false alarms from people carrying tagged items near the zone.

Another advantage of the system is that the information processor can be used to invest control over the system in managerial, as opposed to store, personnel. Thus added is a degree of security not provided by previous systems which can be turned off or otherwise tampered with by store personnel without the knowledge of supervisors who may not be present. This feature is therefore particularly advantageous in chain store operations in that a record of alarm conditions, power shutdowns, and so forth, can be automatically maintained at a location remote from the retail store.

It is apparent that if a transponder is outside the surveillance zone, motion toward or away from one of the boundaries results in corresponding motion toward or away from the other boundary. However, within the zone between the two boundaries, which are defined approximately by the locations of the outer and inner receiving antennas, motion toward one boundary results in motion away from the other boundary. Therefore, false alarms are avoided because an alarm is triggered only when a transponder tag is within the precisely defined surveillance zone by detecting motion in opposite directions relative to the inner and outer boundaries of the zone. If desired, alarm-free motion of a transducer tag into an establishment can be permitted by limiting the triggering of an alarm to the case in which motion is detected in a direction toward the outside boundary and away from the inside boundary.

False alarms from noise-induced interference signals can be further eliminated by requiring a threshold velocity for motion detection and by requiring that the motion continue for a given distance corresponding to a predetermined number of doppler frequency cycles.

Frequency coherence of the surveillance system is advantageously achieved with only two crystal-controlled stable oscillators. The first generates the transmitter carrier frequency of 915 MHz. The second generates a 42.8 MHz reference signal which is divided by 10 to modulate the carrier at ±4.28 MHz; divided by 4 to generate an intermediate frequency signal at 10.7 MHz; and divided by 8 to generate a half intermediate frequency signal at 5.35 MHz. The local oscillator frequency is generated with a coherent phase and frequency relationship by a voltage controlled oscillator having a nominal frequency of the carrier frequency less half the IF frequency. This local oscillator frequency is then modulated with the actual carrier signal to produce a difference signal at half the intermediate frequency. This difference signal is then compared to the generated half intermediate frequency signal and used to maintain the voltage controlled oscillator in a coherent phase locked condition. Coherency is thus maintained through the local oscillator to permit the intermediate frequency signal to be modulated within a quadrature phase, dual frequency detection system by two 90° phase-displaced intermediate frequency signals to generate two quadrature phase, doppler frequency signals indicating speed and direction of the transponder relative to each of the inside and outside boundaries of the surveillance zone.

BRIEF DESCRIPTION OF THE DRAWINGS

A better understanding of the invention can be had from a consideration of the following detailed description taken in conjunction with the accompanying drawings, in which:

FIG. 9 is a graphical representation of certain signal waveforms which are useful in understanding the operation of the doppler signal circuit shown in FIG. 8;

FIG. 10 is a block diagram representation of an information processor used in the system shown in FIG. 4;

FIGS. 11, 12, 13 and 14 are flow charts illustrating the operation of the information processor shown in FIG. 10.

DETAILED DESCRIPTION

Figure 1:
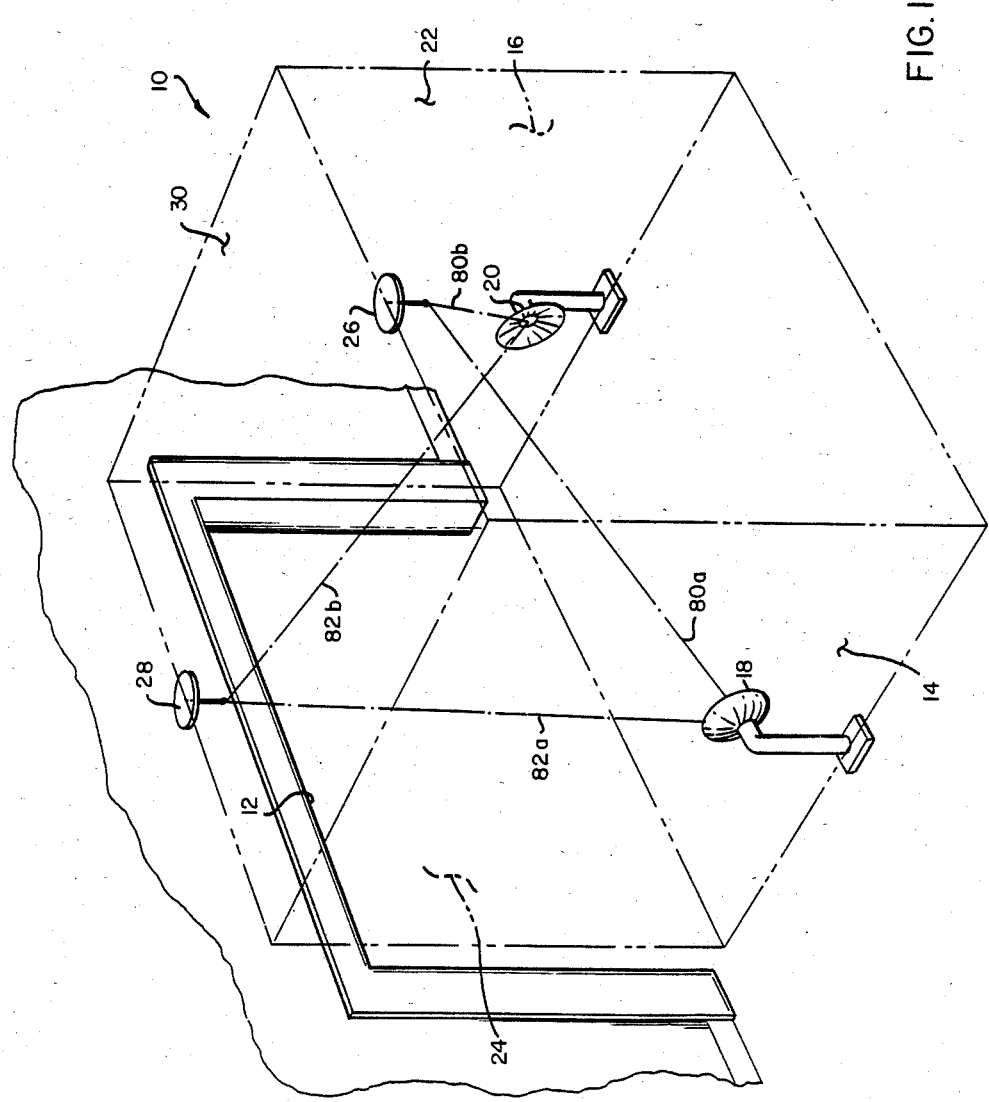
FIG. 1 is a schematic perspective view of the doorway area of a retail store showing the transmitter and receiver antennas and the boundaries of a surveillance zone in accordance with one embodiment of the invention.
Figure 2:
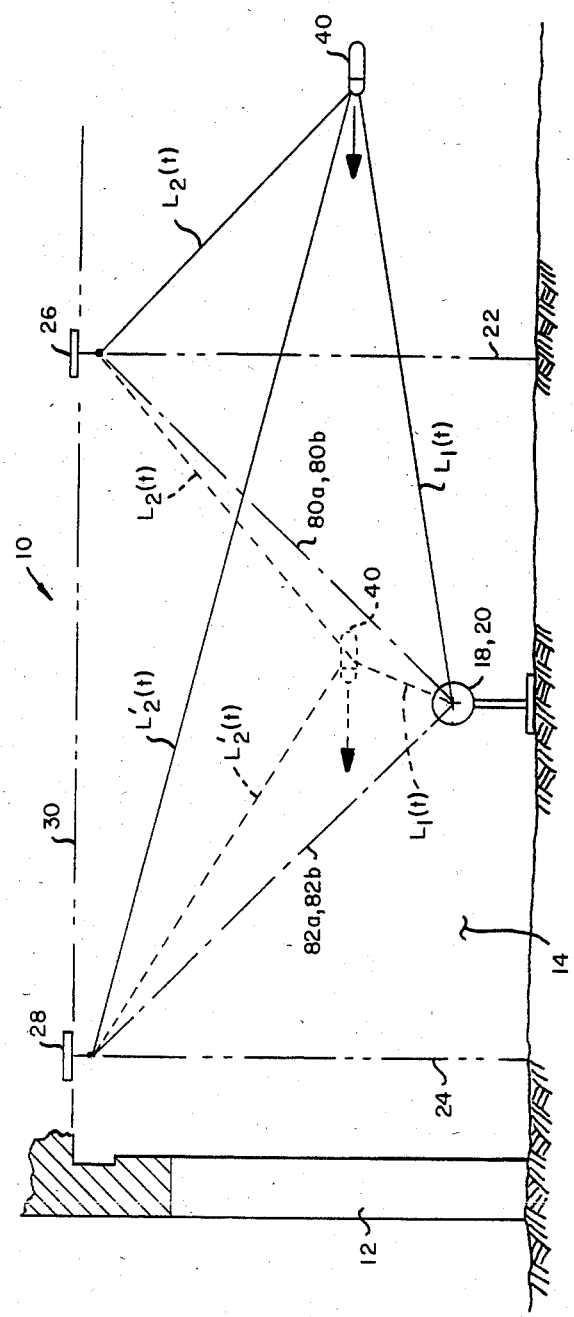
FIG. 2 is a side elevation view of the doorway area of FIG. 1.

Referring to FIGS. 1 and 2, the frequency coherent, doppler effect surveillance system of the invention, in its most typical application, operates within a surveillance zone 10 adjacent the exit 12 of a retail clothing store. The zone 10 has side boundaries 14 and 16 defined by the locations of floor mounted transmitter antennas 18 and 20 which, by way of example, may be placed 30" (76 cm.) above floor level. The positions of the inner and outer boundaries 22 and 24, respectively, of the zone 10 are defined by inner and outer receiver antennas 26 and 28, respectively, in the form of quarter-wave monopoles mounted in or suspended from the ceiling 30. Exiting patrons may be channeled through the zone 10 by appropriate partitions or other barriers which, for the sake of clarity, have not been shown. Within limits, the length and width of the zone 10 are not critical and in accordance with one example the distance between receiving antennas 26 and 28 is 8 feet (2.44 meters) while that separating the transmitting antennas 18 and 20 is 10 feet (3.05 meters). The antennas, of course, may be closer together or further apart depending upon available space and the configuration of a particular doorway or exit area; the outside receiver antenna, moreover, may be placed outside the exit to conserve floor space within the store. In addition, it will be appreciated in light of the ensuing description that because of the ultrahigh frequencies utilized, the antennas used in connection with the present invention are simple, compact, and easily installed and may even comprise portable units whose positions can be readily changed. Thus avoided is the need to embed antenna wires within doorposts and doorsills as in the above-referenced U.S. Pat. No. 3,493,955.

Figure 3:
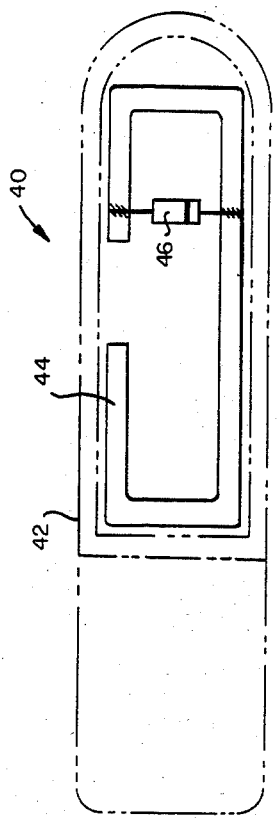
FIG. 3 is a plan view, partly in phantom, of a transponder tag that may be used in conjunction with the surveillance system of the present invention.

Turning now also to FIG. 3, there is shown a transponder tag 40 of the type that is attached to the merchandise being monitored. The structural details, use and manner of attachment and removal of such tags are disclosed in U.S. Pat. No. 3,973,418 and in co-pending application Ser. No. 501,881, filed June 7, 1983, and entitled "PNEUMATICALLY RELEASABLE, TAMPER-RESISTANT SECURITY TAG" by Leo Close. For purposes of describing the present invention, it is sufficient to note that the tag 40 includes a housing 42 enclosing and sealing a transponder or repradiating antenna element 44 formed of brass shim stock in the shape of a generally rectangular, open loop a portion of which is bridged by a nonlinear circuit element such as a diode 46.

Figure 4:
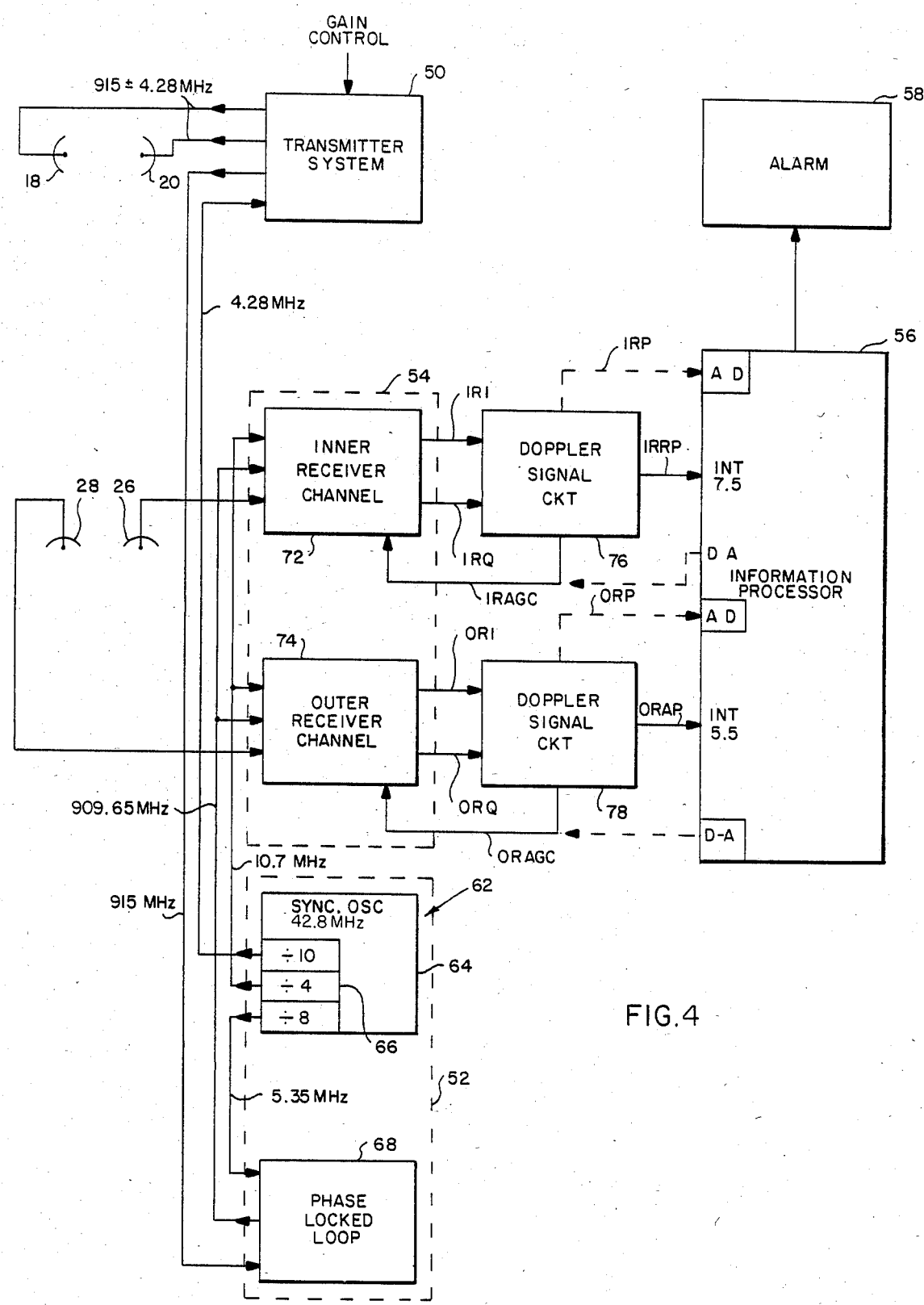
FIG. 4 is a block diagram of the coherent frequency, doppler effect electronic surveillance system of the present invention.

Referring now to FIG. 4, the frequency coherent doppler effect surveillance system in accordance with the invention includes, generally, a transmitter system 50, a coherent signal generating circuit 52, a receiving system 54, an information processor 56, and an alarm 58.

The transmitter system 50 transmits a pair of double sideband, suppressed carrier, amplitude modulated, continuous wave signals at a frequency of 915±4.28 MHz to the transmitting antennas 18 and 20 which radiate the suppressed carrier AM signal throughout the zone 10.

The coherent signal generating circuit 52 includes a reference frequency generating circuit 62 comprising a 42.8 MHz oscillator 64 and divider circuits 66 dividing the 42.8 MHz reference frequency by ten, four and eight respectively. The coherent signal generating circuit 52 further includes a phase locked loop 68 generating a half-frequency, local oscillator signal at a frequency of 909.65 MHz which represents the difference between the 915 MHz transmitted carrier signal and a half-intermediate frequency signal at 5.35 MHz received from reference frequency generating circuit 62. The half-frequency local oscillator signal is phase locked to the half-intermediate frequency signal generated by the divide-by-8 portion of the reference frequency generating circuit 62 and is communicated to the receiving system 54 where a harmonic local oscillator utilizes the second harmonic to demodulate signals produced by a transponder tag 40 in the zone 10.

The receiving system 54 includes an inside receiver channel 72 coupled to receive transponder signals from the inside receiver antenna 26, and an outside receiver channel 74 coupled to receive signals from the outside receiver antenna 28. As will be explained later in greater detail, the inside and outside receiver channels 72 and 74 receive transponder signals from their respective antennas 26 and 28 containing doppler frequency information representative of the motion of the transponder tag 40 relative to the receiving antennas and in response thereto generate quadrature doppler frequency signals which are indicative of the relative speed and direction of motion of the transponder. The information processor 56 receives the speed and direction signals from the receiving system 54 and processes the signals to determine the position and relative motion of a transponder in the surveillance zone 10.

Doppler signal circuits 76, 78 provide an interface between the quadrature analog doppler signals IRI, IRQ and ORI, ORQ respectively and digital interrupt inputs to processor 56. Inner doppler signal circuit 76 responds to signals IRI and IRQ by generating a train of receding pulses on a signal, inner receiver receding pulses, IRRP, as motion is detected in the receding direction relative to the inner antenna 26. Two pulses are generated for each cycle of the doppler frequency signals. Similarly, outer receiver doppler signal circuit 78 generates a train of approaching pulses on a signal, outer receiver approaching pulses, ORAP, as motion is detected in the approaching direction relative to the outer antenna 28. Two pulse trains are thus communicated to information processor 56 only when a transponder is between the two antennas 26, 24 and moving toward the doorway 12. The doppler signal circuits are described in greater detail hereinafter.

The doppler signal circuits 76, 78 also respond in a conventional fashion to the power levels of the input signals to IRI, IRO, and ORI, ORQ respectively to generate automatic gain control signals IRAGC and ORAGC. In a preferred relationship gain is maintained at a maximum until the input power exceeds a selected threshold. Gain is then decreased as input power continues to increase so as to maintain the input power level approximately constant.

In an alternative arrangement indicated by dashed lines, the doppler signal circuits 76, 78 generate power signals IRP, ORP respectively representing input signal power which are communicated to an analog-to-digital converter, A-D, within information processor 56. Information processor 56 then uses this information to calculate AGC signal levels which are output through digital-to-analog converters, D-A, to the inner and outer receivers 72, 74.

With reference to FIGS. 1 and 2, it will be observed that when the transponder tag 40 (in broken lines) is within the zone 10 and is moving toward the outer boundary 24, it approaches the outer receiving antenna 28 and recedes from the inner receiver antenna 26. When information processor 56 receives pulses on signals IRRP and ORAP indicating motion in these relative directions, it determines that the transponder is within the zone 10 and moving in a direction toward the exit or outer boundary of the zone and generates an alarm signal.

More precisely, the doppler position with respect to each receiving antenna is defined by the sum of the time varying distance $L_1(t)$ from a transmitting antenna 18 or 20 to the transponder tag 40 and the time varying distance $L_2(t)$ from the transponder tag 40 to the particular receiving antenna 26 or 28. (In FIG. 2, $L_2(t)$ represents the distance from the tag 40 to antenna 26, while $L_2'(t)$ designates the distance to antenna 28). The shortest distances between the transmitting and receiving antennas, however, are straight lines 80a, 80b near the inner boundary and 82a, 82b near the outer boundary. The line pairs 80a, 80b define a pair of inclined planes. An approaching doppler frequency signal will thus be indicated as the transponder tag approaches a given one of these planes and a receding doppler frequency signal will be indicated as the transponder recedes from that plane. The actual inner confine of the zone 10 is thus the imaginary plane defined by lines 80a and 80b while the actual outer confine is the imaginary plane defined by lines 82a and 82b. It is a sufficiently good approximation, however, to think of the confines of the surveillance zone 10 as being located at the vertical inner and outer boundaries 22 and 24.

FIG. 2 also shows the geometry of the system when the transponder tag 40 (shown in solid lines) is located inside the store adjacent the zone 10 but not within the boundaries thereof. From this position, as the transponder 40 moves toward the exit 12, it moves closer to both the inner boundary 22 and the outer boundary 24. Similarly, as the transponder 40 moves away from the exit, it moves away from both the inner and outer boundaries 22 and 24. Consequently, upon receiving information that the transponder tag 40 is moving in the same relative direction with respect to both the inner and outer boundaries, the information processor 56 determines that the transponder is not within the zone 10 even though it is sufficiently close to permit detection by the receiving antennas. Consequently, the alarm 58 is not energized.

In summary, the present surveillance system can determine by monitoring the relative direction of a transponder tag with respect to both the inner and outer boundaries of a surveillance zone 10 whether the transponder is actually inside the zone and moving toward the exit. This information can be used to determine whether or not the alarm 58 should be activated.

Figure 5:
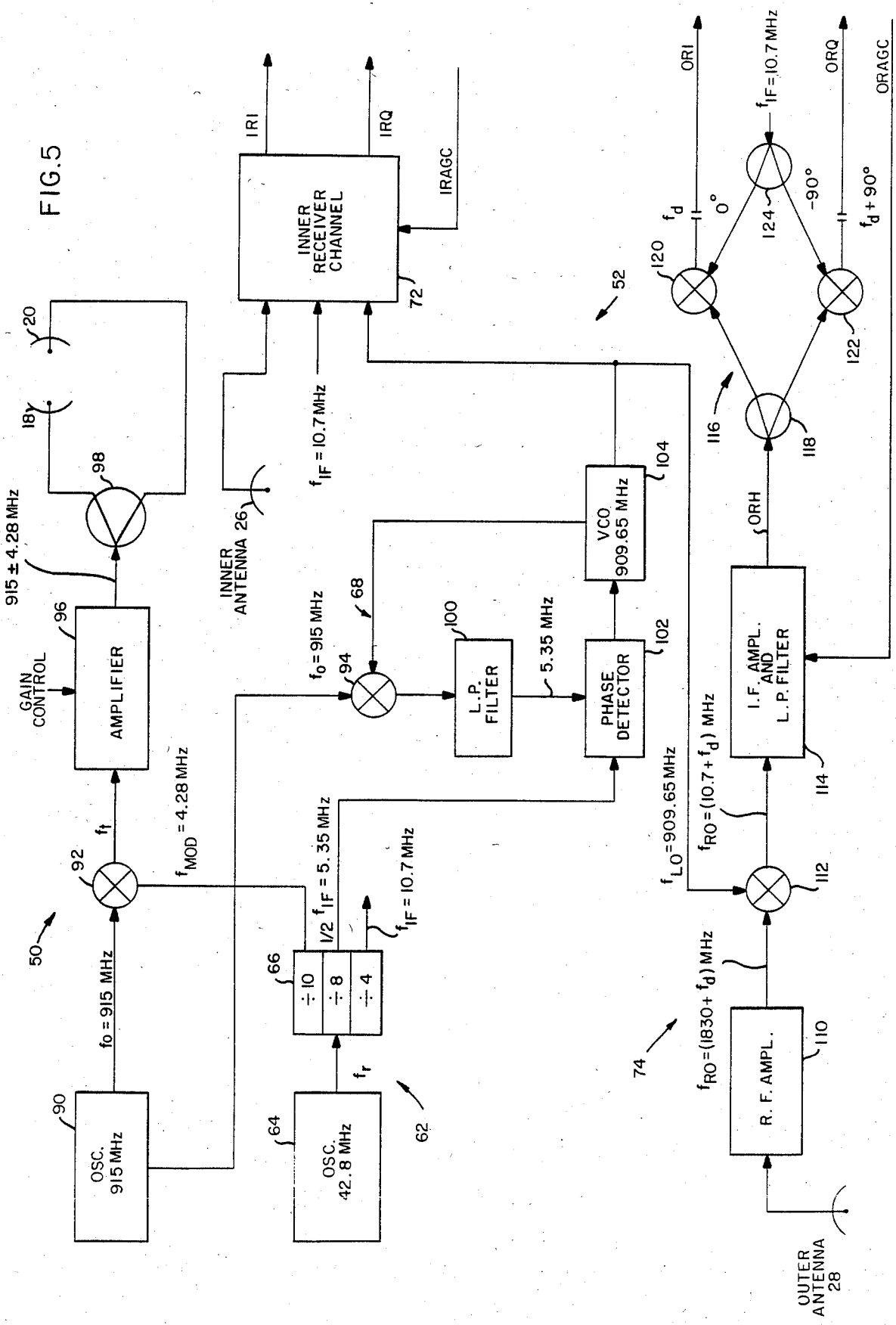
FIG. 5 is a more detailed schematic and block diagram of the electronic surveillance system depicted in FIG. 4.

Referring now to FIG. 5, which shows the circuitry of the surveillance system in greater detail, the reference frequency generating circuit 62, as already stated, includes a 42.8 MHz, crystal-controlled, stable oscillator 64 and frequency divider circuits 66. The frequency divider circuit 66 receives the 42.8 MHz sine wave reference signal, $f_r$, from oscillator 64 and divides the signal by factors of 4, 8 and 10 to generate frequencies of 10.7 MHz, 5.35 MHz and 4.28 MHz, respectively, having a fixed phase and frequency relationship to the 42.8 MHz reference signal and to each other to provide signal coherency for accurate doppler frequency and phase detection.

The transmitter system 50 includes a 915 MHz crystal-controlled stable oscillator 90 generating an RF carrier signal, $f_o$. Although not shown, oscillator 90 may be conveniently implemented as a phase locked loop having a 915 MHz voltage controlled oscillator, a divide-by-64 frequency divider and a 14.2969 MHz crystal reference oscillator. The carrier signal, $f_o$, is coupled to a balanced transmitter modulator 92 within transmitter 50 and also to a modulator 94 within the phase locked loop 68. Modulator 92 also receives the 4.28 MHz modulation signal, $f_{Mod}$, from the frequency divider circuit 66 and generates the transmitted signal $f_t$. Signal $f_t$ is an amplitude modulated, suppressed carrier double sideband signal having the carrier suppressed 23 db below the sidebands which occur at (915+4.28) MHz, or 919.28 MHz, and (915−4.28) MHz, or 910.72 MHz. Alternatively, the transmitted signal could be frequency modulated.

The transmitted signal $f_t$ is coupled to a linear amplifier 96 having a manually selectable gain control which permits adjustment of the power of the transmitted signal to accommodate variations in the size and shape of the surveillance zone 10 to provide adequate signal strength throughout the zone. The amplifier transmitted signal is coupled from amplifier 96 to an in-phase power divider 98 and then to the two transmitting antennas 18 and 20 for radiation throughout the zone 10.

In addition to the modulator 94, the phase locked loop 68 includes a low pass filter 100 passing a half-intermediate frequency signal, $\frac{1}{2} f_{IF}$, at 5.35 MHz, a phase detector 102 and a 909.65 MHz voltage controlled oscillator 104 operating under control of the phase detector 102. Oscillator 104 thus generates a coherent local oscillator signal, $f_{lo}$ at approximately 909.65 MHz. Because it is phase locked to signal $\frac{1}{2} f_{IF}$, $f_{lo}$ is precisely at a frequency $(f_o - \frac{1}{2} f_{IF})$ and at a phase angle of 0° relative to the reference signal $f_r$ irrespective of any variations in the carrier and reference signal frequencies which can be expected to be of the order of a few hundred Hertz.

The diode 46 in the transponder tag 40 modulates the upper and lower sidebands of the transmitted signal to produce inter alia, a receiver signal at a frequency $$f_r = (f_o + f_{Mod}) + (f_o - f_{Mod}) + f_d \tag{1}$$

which simplifies to $$f_R = 2f_o + f_d \tag{2}$$

irrespective of any variation in $f_{Mod}$ from the nominal frequency of 4.28 MHz, $f_d$ is the doppler frequency variation superimposed upon the transmitted signal as a result of any motion of the transponder tag 40.

The inner receiver channel 72 and the outer receiver channel 74 are identical in construction and manner of operation. Therefore the following description is presented only with respect to the outer receiver channel 74 but it should be appreciated that the description is equally applicable to the inner channel.

The outer receiver channel 74 includes an R.F. amplifier 110 which receives from outer antenna 28 and amplifies an outer received signal, $f_{Ro}$ at a frequency of $(2f_o + f_d)$ MHz. The amplified received signal is coupled from amplifier 110 to a harmonic mixer 112 which modulates the received signal with the local oscillator signal, $f_{lo}$, to produce a received intermediate frequency signal at approximately $(10.7 + f_d)$ MHz. The actual frequency is $$f_{RIF} = 2f_o + f_d - 2(f_o - \tfrac{1}{2} f_{IF}) \tag{3}$$

which reduces to $$f_{RIF} = f_{IF} + f_d \tag{4}$$

It should be noted that just as small variations from nominal in the 4.28 MHz modulation frequence are cancelled by both addition and subtraction thereof relative to the carrier frequency, small variations in the carrier frequency are similarly cancelled by subtracting twice the carrier frequency (less $f_{IF}$) from the received signal frequency to leave the exact frequency defined by equation (4). Furthermore, because the phase and frequency of signal $f_{IF}$ are precisely defined by the divide-by-4 output of frequency divider 66, signal $f_{IF}$ can subsequently be removed from signal $f_{RIF}$ as described hereinafter to produce the doppler frequency motion signal, $f_d$.

An IF amplifier and low pass filter circuit 114 receives from mixer 112 and amplifies the received intermediate frequency signal $f_{RIF}$. Higher frequency modulation products and harmonics are removed by low pass filtering.

At this point, the doppler frequency signal $f_d$ can be either positive or negative and thus contains both directional and speed information. Simple detection by an amplitude detector or modulation by signal $f_{IF}$ would result in loss of the directional information. The doppler frequency detector is therefore implemented as a quadrature phase angle, polarity (direction)-preserving detector 116.

The polarity-preserving detector 116 includes a balanced power splitter 118 which receives signal $f_{RIF}$ from amplifier 114 and distributes it equally to two detector modulators 120 and 122. a Phase-shifting power splitter 124 receives the intermediate frequency signal, $f_{IF}=10.7$ MHz, at zero phase angle and couples half of this signal to modulator 120 with zero phase shift and the other half to modulator 122 with a negative or lagging phase shift of 90°. The two modulators 120, 122 thus produce as significant signal components quadrature doppler frequency signals ORI=$f_d$ at 0° and ORQ=$f_d$ at 90°. The transponder speed is represented by the frequency of signal $f_d$ while the direction is preserved by the quadrature phase relationship signals ORI and ORQ. If $f_d$ is positive, the transducer is moving toward the receiving antenna 28 and signal ORQ leads signal ORI by 90°. If $f_d$ is negative, the transducer is moving away from the receiving antenna 28 and signal ORQ lags signal ORI by 90°.

To more fully appreciate this phase relationship, equation (4) can be more rigorously written in terms of radians per second as $$W_{RIF} = W_{IF}\left[\frac{L_1(t) + L_2(t)}{c}\right] (2W_c) \quad (5)$$

Where $W_{RIF}$ is the received intermediate frequency signal in radians per second, $W_{IF}$ is the reference intermediate frequency signal in radians per second, $L_1(t)$ is the time-varying distance from the transmitter to the transponder, $L_2(t)$ is the time varying distance from the transponder to the receiving antenna, c is the speed of light, and $W_c$ is the frequency of the carrier signal in radians per second ($2\pi \times 915$ MHz). The received intermediate frequency signal can also be represented as $$ORH = A \sin\left[W_{IF}t + 2W_c\left(\frac{L_1(t) + L_2(t)}{c}\right)\right] \quad (6)$$

where A is a constant representing peak magnitude.

Modulation of signal ORH with the zero phase angle intermediate frequency signal B sin $W_{IF}t$ results in the significant product term $$ORI = \left(\frac{AB}{2}\right) \cos\left[2W_c\left(\frac{L_1(t) + L_2(t)}{c}\right)\right] \quad (7)$$

Similarly, modulation of signal ORH with the 90° phase shifted intermediate frequency signal B sin $(W_{IF}t-(\pi/2))$ results in the significant product term $$ORQ = \left(\frac{AB}{2}\right) \cos\left[2W_c\left(\frac{L_1(t) + L_2(t)}{c}\right) + \frac{\pi}{2}\right] \quad (8)$$

Figure 6:
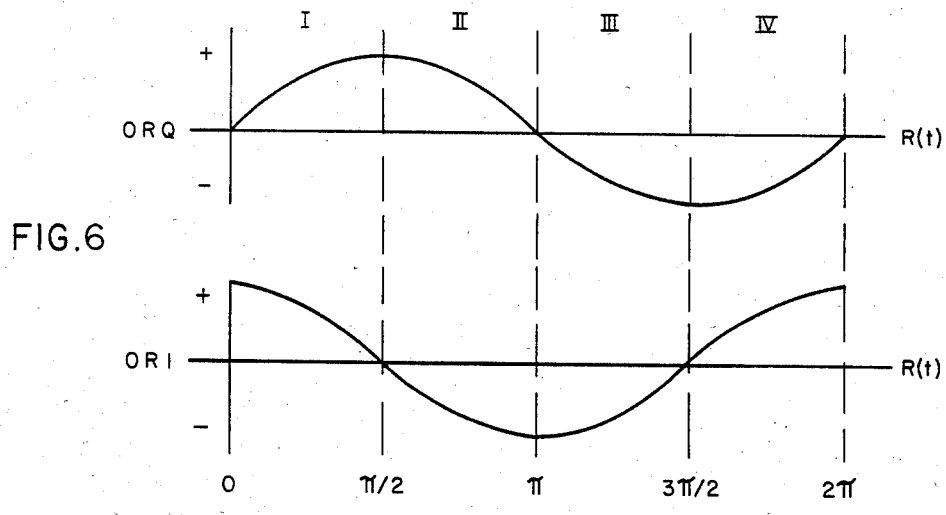
FIG. 6 is a graphical representation of two quadrature phase doppler frequency signals generated by the system shown in FIGS. 4 and 5.

FIG. 6 illustrates ORI and ORQ respectively as a function of R(t) where, $$R(t) = 2W_c\left(\frac{L_1(t) + L_2(t)}{c}\right) \quad (9)$$

Figure 7:
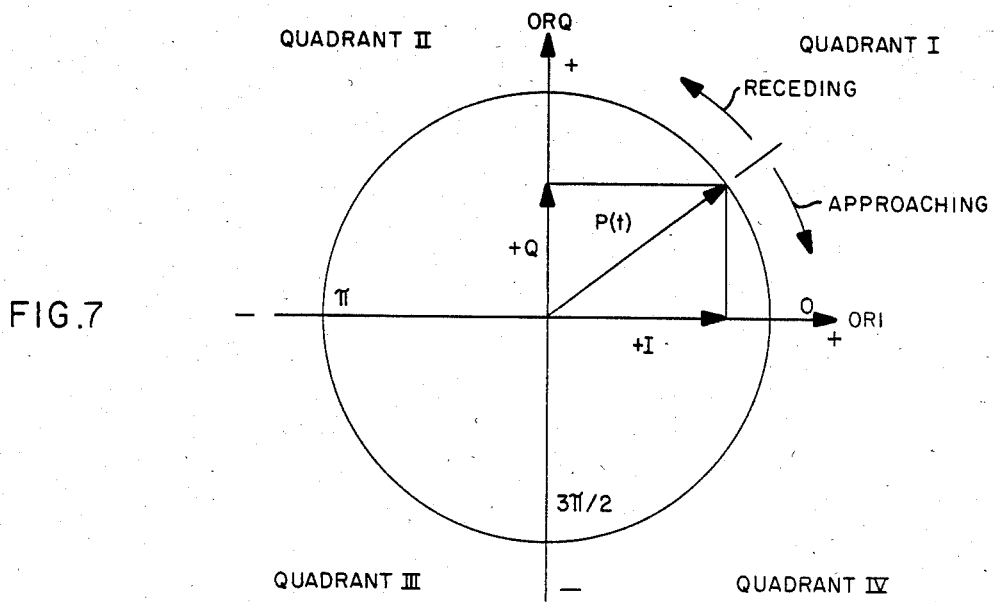
FIG. 7 is a pictorial representation of a rotating position vector that is the vector sum of the quadrature phase signals shown graphically in FIG. 6.

To facilitate detection of this relative phase (direction) information by the information processor 56, the quadrature signals ORI and ORQ can be conceptualized as defining a rotating position vector P(t) in a two dimensional coordinate space having signal ORI as the abscissa direction and signal ORQ as the ordinate direction as illustrated in FIGS. 6 and 7. If the transponder tag 40 is receding from the exit or outer boundary 24, R(t) is increasing for the outside receiver and vector P(t) rotates in a counterclockwise direction. The signs of the signals ORI and ORQ vary in a repetitive sequence as P(t) rotates through the different quadrants as shown in Table I:

TABLE I

| | Quadrant | | | |
|---|---|---|---|---|
| | I | II | III | IV |
| ORI | + | − | − | + |
| ORQ | + | + | − | − |

By detecting the simple pattern of changes in the signs of ORI and ORQ, the direction of motion can be readily determined. For example, a change from ORI, ORQ=+, +to +, − would indicate motion in the approaching direction while a change from +, + to −, + would indicate motion in the receding direction.

Figure 8:
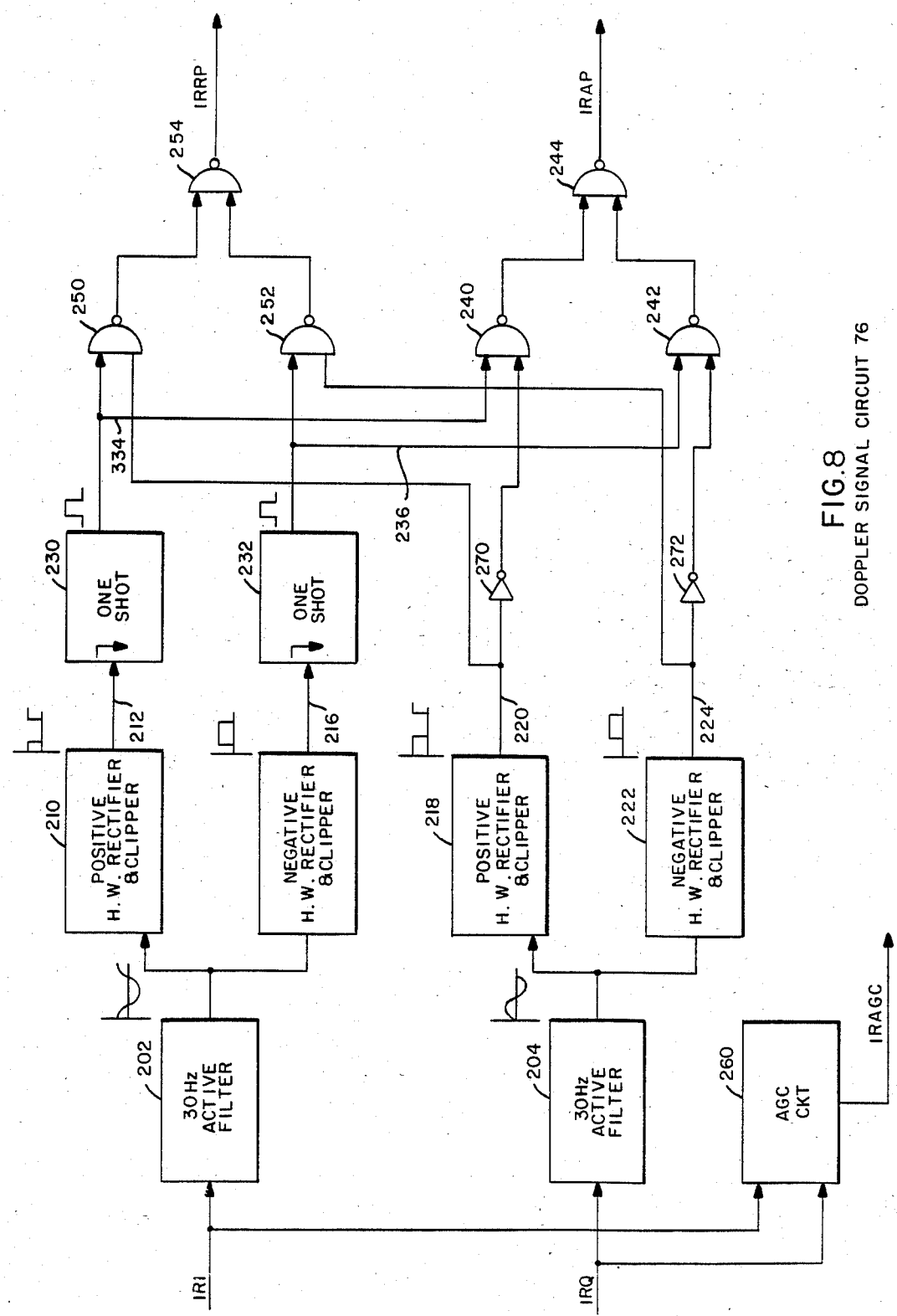
FIG. 8 is a schematic and block diagram representation of a doppler signal circuit used in the system shown in FIG. 4.

Referring now to FIGS. 8 and 9, there is shown the doppler signal circuit 76 which receives the doppler frequency signals IRI and IRQ and generates the receding pulse train IRRP in response thereto. Signal IRI is amplified and filtered by a 30 Hz active low pass filter 202. The output of filter 202 is a high quality sinewave at the doppler frequency. The transmitters 50 and receivers 72, 74 are typically operated in a pulse mode with a 10% duty cycle, e.g. 100 nanoseconds on, 900 nanosecond off, to reduce power consumption and permit noninterferring alternating operation. Signals IRI and IRQ thus have intermittent, sampled values but active filter 202 and a corresponding IRQ active filter 204 restore the signals to produce smooth, continuous sinewaves at the outputs thereof. Output signals 206, 208, from filters 202, 204 respectively are illustrated in FIG. 9.

A positive half wave rectifier and clipper 210 receives the sinewave output from filter 202 and produces a positive rectangular wave pulse on signal 212 during the positive half cycles of signal 206. In order for pulse train IRRP to contain twice as many pulses for a given distance of motion of a transponder within the controlled area, a negative half wave rectifier and clipper 214 receives the output signal 206 from filter 202 and produces a positive rectangular pulse 216 during each negative half cycle of sinewave 206. This doubles the pulse rate of the detected doppler cycle pulse to about 1830 per foot of transducer motion for the frequencies used herein. In a corresponding manner a positive half wave rectifier and clipper 218 produces a rectangular wave signal 220 and a negative half wave rectifier and clipper 222 produces a rectangular wave signal 224. The signals 212, 216, 220 and 224 are illustrated in FIG. 9.

One shot circuits 230, 232 respond to signals 212, 216 respectively to generate a short positive pulse signal 234, 236 in response to each negative transition in the input signal. These pulse signals are illustrated in FIG. 9 superimposed upon the respective input signals 212, 216.

A NAND gate 240 receives the pulses 234 as one input and the rectified rectangular wave signals 220 as a second input. As illustrated in FIG. 9, as long as a transponder is receding from inner antenna 26, signal 220 will be positive to enable NAND gate 240 at each occurrence of the pulses 234 and the pulses 234 will be passed through to a NAND gate 244. If the transponder is approaching inner antenna 26, then signal 220 will be oppositely phased to present logic zero at each occurrence of one shot pulse 234 and NAND gate 240 will be disabled so that no pulses are generated on signal IRRP. At the same time, NAND gate 240 will be enabled to generate signal IRAP through NAND gate 244.

Similarly, a NAND gate 252 passes one shot pulses 236 when enabled by signal 224 in response to a receding transponder. NAND gate 242 receives through inverter 272 the complement of signal 224 to pass pulse signal 236 in response to an approaching transponder. NAND gate 244 receives the outputs of gates 240 and 242 to generate the double frequency pulse train signal IRRP containing the one shot pulses 234, 236 when enabled by an approaching transponder and NAND gate 254 receives the outputs of gates 250 and 252 to generate the double frequency pulse train signal IRRP containing the one shot pulses 234, 236.

An automatic gain control circuit 260 is conventional and operates in response to signals IRI and IRQ to generate the automatic gain control signal IRAGC to control the gain of inner receiver 72.

The outer receiver doppler signal circuit 78 may be substantially identical to the inner receiver doppler signal circuit shown in FIG. 8. The approaching pulse output signal is used instead of the receding pulse output signal. It will be apparent that signals IRRP, IRAP, ORRP and ORAP could all be communicated to information processor 56. This would permit the processor 56 to detect either direction of motion within or on either side of the controlled area.

Referring now to FIG. 10, the information processor 56 is shown as including a conventional STD bus 312 interconnecting a micro processor CPU 314 such as an Intel 8085, an 8255 I/O port 316 providing an interface to a set of 6 DIP switches 318, an 8253 programmable timer 320, a RAM store 322, a ROM program store 324, and an optional display 326. A-D and D-A conversion circuits 330 are shown connected to bus 312 as an alternative means of generating the automatic gain control signals IRAGC and ORAGC.

The outer receiver approaching signal, ORAP, is connected to interrupt 5.5 of CPU 314, the inner receiver receding signal connected to interrupt 7.5 and a timing interrupt signal from timer output 2 of programmable timer 320 is connected to interrupt 6.5.

Three of the six switches 318 are used to select a binary coded value which determines a time out window for detecting an intrusion. For example, a setting of 5 would require five 20 millisecond timing intervals for a total window time of 100 msec. The other three switches select a binary coded number indicating the number of doppler pulse signals, ORAP, IRRAP which must be received within the time window before an alarm is sounded, for example 6. Requiring a selected plurality of pulses within a time period substantially reduces false alarms resulting from noise or other sources. False alarms are further reduced by requiring that the selected number of pulses be generated by both the inner receiver 26 and outer receiver 28.

CPU 314 has interrupt 6.5 connected to output 2 of timer 320. Outputs 1 and 0 remain available for system functions not pertinent to the present invention. The alarm system 340 is coupled through I/O port 316 to be selectively turned on and off by CPU 314. Alarm 340 responds to one of the data bus signals which is not coupled to any of the DIP switches 318.

The main program for monitoring the controlled area is illustrated in FIG. 11. At turn-on the processor executes initializaion routines. It initializes the I/O ports and the processor flag array. It then intializes the various counters including the window time counter, the approaching pulse counter IPA) and the receding pulse counter (PR). The processor 314 then enables interrupt 5.5 and disables interrupts 6.5 and 7.5 before entering a repetitive loop.

In the loop CPU 314 performs self-diagnostic tests and logs any faults that are found. These tests typically include testing of the power supply, and AC power levels, memory tests and I/O tests. The D-A and A-D converters 330 may be tested if present. After the tests are completed CPU 314 determines and displays the local time Then, if the information processor 56 is controlling the receiver gain signals, these signals are updated. The loop is then repeated.

While the main program loop is being repetitively executed interrupt 5.5 is enabled to permit monitoring of the controlled area within the range of the outer receiver antenna 28. The transponder detection algorithm is designed to reduce or eliminate noise induced false alarms. When an approaching pulse is detected a time window is started and approaching and receding pulses are alternately counted. If the preset number of pulses are counted within the time window an alarm is set off, otherwise the pulse counters are reset and the CPU 314 begins waiting for a first approaching pulse again.

Figure 12:
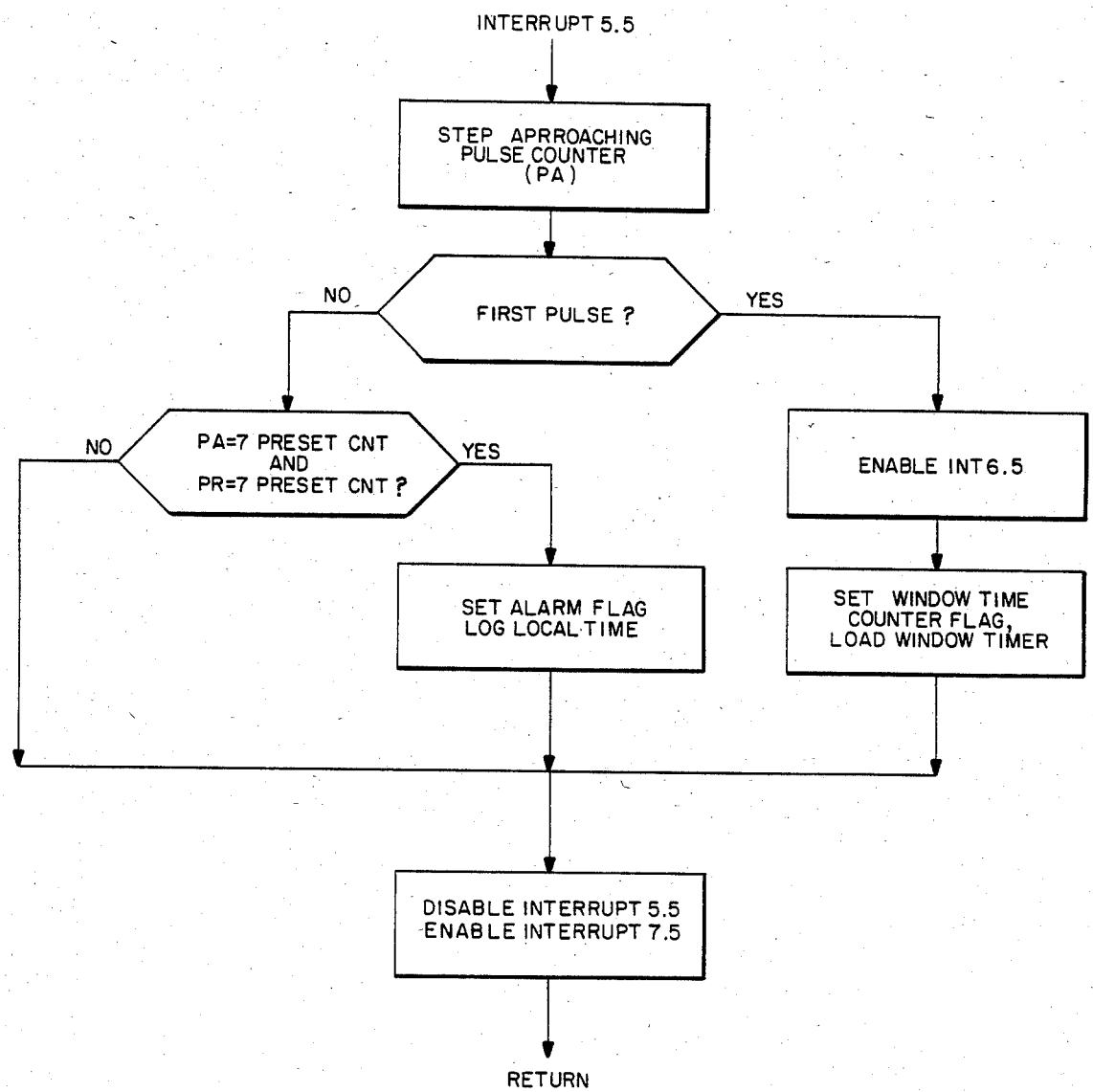

The routine for responding to approaching pulse interrupt routine 5.5 is illustrated in greater detail in FIG. 12. Upon entering the routine in response to receipt of an approaching pulse the approaching pulse counter (PA) is stepped. If this is the first counted pulse the window timer interrupt 6.5 is enabled, the window time counter flag is set and the window timer is loaded. Otherwise it is determined if both the approaching pulse counter IPA) and the receding pulse counter (PA) have reached the preset count. If yes, an alarm flag is set and the local time is logged to permit monitoring of alarm activities by management personnel.

Before interrupt 5.5 is exited, interrupt 5.5 is disabled and interrupt 7.5 is enabled. Thus, after each approaching pulse is detected, the information processor 56 begins waiting for a receding pulse. If the transducer is not actually in the controlled zone, the window will time out before a receding pulse is received and the system will return to the initial condition of waiting for a first approaching pulse.

The timing interrupt routine 6.5 is illustrated in FIG. 13. Programmable timer 320 is programmed to issue an interrupt signal every 20 msec. When interrupt 6.5 is enabled CPU 314 responds by first reloading the timer for the next 20 msec interrupt.

If the alarm flag is set an alarm processing routine is executed. This routine first decrements the alarm time counter and then tests the counter for zero. If the alarm time counter has been decremented to zero, indicating that the alarm has been activated for the prescribed period of time, the alarm flag is reset and the alarm is turned off. Then the interrupt 7.5 is disabled and interrupt 5.5 is enabled before proceeding to test the window time counter flag.

If the window time counter flag is set, meaning that at least a first approaching pulse IRRP has been detected, the window time counter is decremented and then tested. If zero, a window time out has occurred and the detection mechanism is reset by resetting the window time counter flag and resetting the pulse counters PA, PR. Then interrupt 7.5 is disabled and interrupt 5.5 is enabled to return CPU 314 to a state of waiting for a first approaching pulse on signal ORAP before the routine 6.5 is exited.

The routine for processing interrupt 7.5 is shown in FIG. 14. This routine simply increments the receding pulse counter (PR) and then returns CPU 314 to a state of waiting for a next approaching pulse IRRP while the window timer function continues to operate.

It will thus be appreciated that as a transponder enters the control zone between the inner and outer antenna 26, 28, and proceeds in a direction toward the outer antenna, the motion produces doppler signals which result in pulses On siqnals IRAP and ORAP. When a selected number of these pulses have been counted on each signal, the alarm system 340 is turned on and the event is logged.

Figure 15:
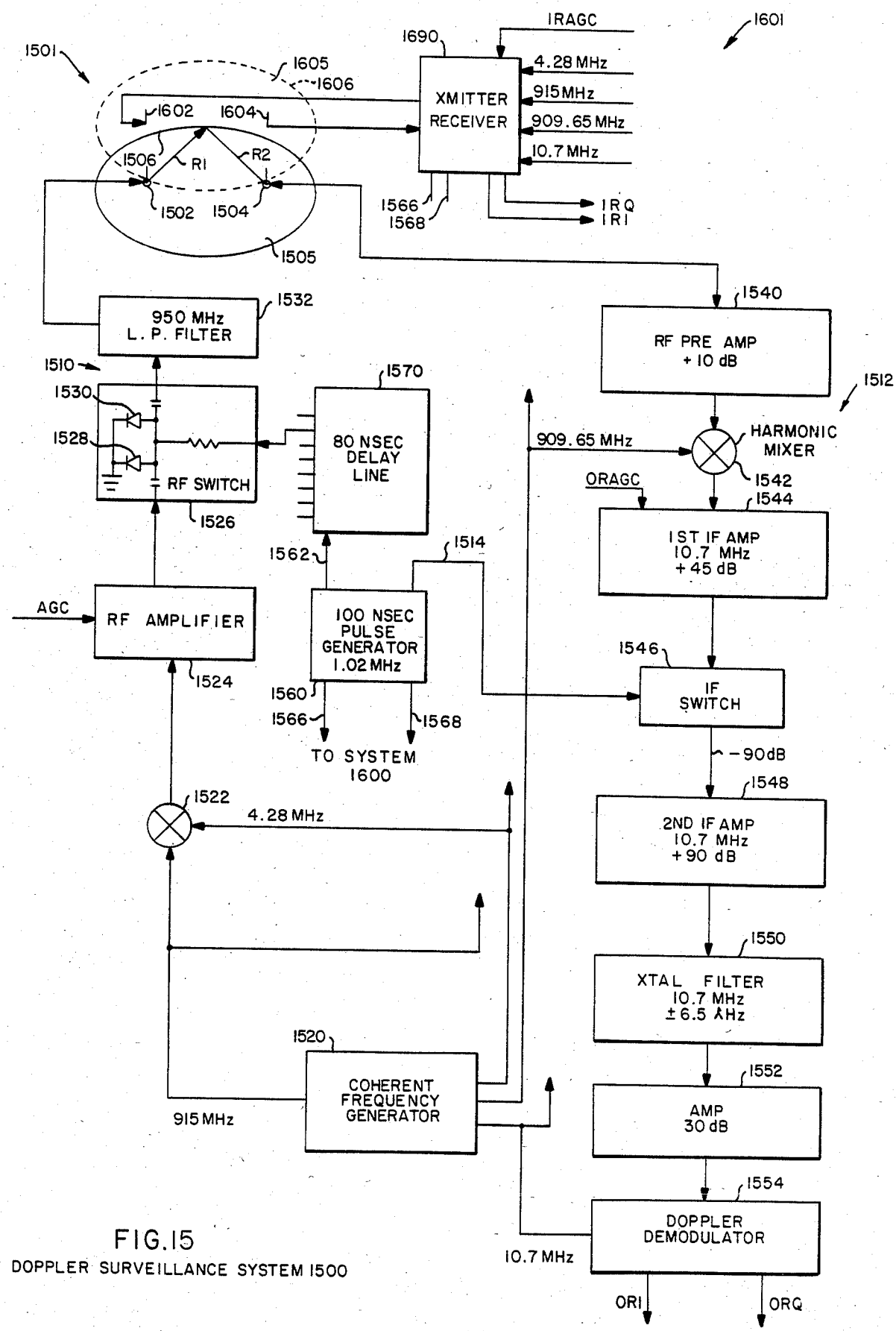
FIG. 15 is a schematic and block diagram representation of an alternative surveillance system in accordance with the invention.

In an alternative arrangement illustrated in FIG. 15 the transmitters and receivers of a doppler surveillance system 1500 are rapidly switched with a short, controlled overlap in their on times. Consequently, any transponder away for the transmitted signal to propagate from the transmitter to the transponder to the receiver within the overlap time window will not be detected. A precise range limit is thus effectively imposed upon the system.

The surveillance system 1500 includes an outer surveillance system 1501, and an inner surveillance system 1601. Surveillance system 1601 is substantially identical to system 1501 except that system 1601 is physically positioned inward of system 1501 relative to an area of controlled access.

The surveillance system 1501 includes an outer transmitter antenna 1502 and an outer receiver antenna 1504 spaced apart from a surveillance area on opposite sides thereof. The propagation rate of the radar signal transmitted from antenna 1502 is approximately one nanosecond per foot. The distance from antenna 1502 to a transducer is represented by a vector R1 while the distance from the transducer to receiving antenna 1504 is represented by vector R2. The total propagation distance thus becomes the sum R1+R2. For a constant overlap time this sum will be a constant at maximum range. For example if the overlap time is 20 nsec, the sum of R1+R2 will be approximately 20 feet at the maximum range. This maximum range limitation defines a surveillance area bounded by an ellipse 1506 with transmitting antenna 1502 and receiving antenna 1504 at the focii of the ellipse 1506.

If the range of the surveillance system is controlled by the transmitted power and sensitivity of the receiver, then the boundary of the surveillance area becomes very imprecise as atmospheric conditions change, as the controlled parameters drift and as the characteristics and orientations of the transducers vary. A substantial guardband must thus be provided around the contemplated surveillance area in order to protect against detection of proper customer activity as a false alarm condition.

Because of the high cost of floor space in a retail store or other establishment, it is desirable to maintain the surveillance area and surrounding guardband as small as possible. The use of inner and outer receiver antennas 26, 28 as illustrated in FIGS. 1–14 substantially reduces the risks of a false alarm, but as long as a transponder is within the range of the receivers some danger of a false alarm still exists. The time limited system 1501 further reduces the risk of false alarms by precisely limiting the system range and hence the surveillance area.

The precision of the switched surveillance system 1501 by itself is sufficient that a single transmitter receiver 1510, can be utilized. The presence of any motion of a transponder within the surveillance area 1505 for sufficient distance to provide noise immunity produces an alarm. However, in a preferred arrangement providing even greater protection against false alarms, inner and outer surveillance systems 1501, 1601 are provided with an overlap of their surveillance areas. The dashed line boundary 1606 is illustrative of such an inner receiver surveillance area. The sounding of an alarm can thus be limited to the condition wherein a transponder approaches the outer system while receding from the inner system as in the arrangement of FIGS. 1–14.

While separate transmitters and receivers are contemplated for the two systems 1501, 1601 it will be recognized that costs can be reduced by sharing certain portions, such as the coherent frequency generator. While details of the system 1601 have been omitted for clarity, it will be appreciated that system 1601 can be substantially identical to system 1500 with transmitter receiver 1690 including the same circuitry as transmitter 1510 and receiver 1512.

System 1501 includes a coherent frequency generator 1520 similar to generator 52 which generates phase locked signals of 915 MHz, 4.28 MHz, 909.65 MHz and 10.7 MHz. An RF mixer 1522 mixes the 915 MHz carrier signal with the 4.28 MHz modulation signal to produce upper and lower sidebands. The sidebands are communicated from mixer 1522 through an RF amplifier 1525 to an RF switch 1526.

RF switch 1526 includes a pair of PIN diodes 1528, 1530 coupling a transmission path to ground between two coupling capacitors. While diodes 1528, 1530 are nonconductive they provide an open circuit between the transmission path and ground. However, application of a positive D.C. switching voltage to the transmission path causes diodes 1528, 1530 to begin conducting and produce an RF short circuit to ground. RF power is thus prevented from reaching transmitting antenna 1502.

While the switch 1526 is closed (diodes 1528, 1530 are non-conductive), the sideband signals are communicated through switch 1526 to a low pass filter 1532 having a cutoff frequency of 950 MHz. Filter 1532 in turn drives antenna 1502.

Whenever a transducer is within the surveillance region 1506 the transmitted upper and lower sidebands are added together to produce a reflection signal at 930 MHz which is picked up by receiver antenna 1504 and coupled to a +10 db RF preamplifier 1540. From preamplifier 1540 the received signal is communicated through a harmonic mixer 1542 which also receives the 909.65 MHz coherent signal to produce a 10.7 MHz IF signal. The IF signal is coupled through a +45 db IF amplifier 1544 to an IF switch 1546, which may be a type S1 manufactured by Watkins and Johnson This switch produces a 90 db loss when open.

From switch 1546 the IF signal is communicated through a +90 db second IF amplifier 1548, a crystal filter 1550, and a +30 db amplifier 1552 to a doppler demodulator 1554 which may be substantially the same as demodulator 116.

A 100 nanosecond pulse generator 1540 operates at a frequency of 1.02 MHz to produce switching control signals for the transmitters and receivers of the systems 1501, 1601. The 1.02 MHz repetition rate produces a signal period slightly less than 1000 nanoseconds and is selected to avoid production of any harmonics at the 10.7 MHz IF frequency.

During each cycle, inner receiver switching pulses are produced during the 0–100 nsec time interval on signals 1562 and 1564. Signal 1562 is communicated to a delay line 1570 where an 80 nsec delay tape is selected for communication of a delayed switching control signal to transmitter switch 1530. Signal 1564 is connected directly to receiver switch 1546.

During each cycle at time 0 the receiver turns on but there is no transmitted signal. At time 80 nsec the output control signal from delay line 1570 turns on transmitter 1510 and 20 nsec later at time 100 nsec receiver 1512 is turned off. 80 nsec later at time 180 nsec transmitter 1510 is turned off but since the receiver 1512 was previously turned off, the signals transmitted during the last 80 nsec are ignored.

Since receiver 1512 turns off 20 nsec after transmitter 1510 turn on, a reflected transponder signal cannot be detected unless it can travel from the transmitter to the transponder and back to the receiver in 20 nsec. This imposes an effective range R1+R2 of about 20 feet (1 foot per nanosecond). The range can of course be adjusted by using different taps from delay line 1570 to select a desired overlap window between the active times of the transmitter 1510 and receiver 1512.

Because the ranges of the surveillance system 1500 is controlled by the difference between the on time of transmitter 1510 and the off time of receiver 1512 it is important that these parameters be carefully controlled. Pulse generator 1560 provides precise 100 nsec pulses and delay line 1570 provides a precisely selectable delay. The overlap window is therefore precisely controllable. In addition, in order to minimize drift and corresponding changes in the surveillance area boundary, the RF transmitter switch 1526 has a rise or turn-on time of only 3 nanoseconds while the receiver switch 1546 has a pole or turn-off time of only 1 nanosecond. The boundary of surveillance area 1506 can therefore be held constant and predictable within a resolution of about ±1 foot in terms of distance from the antennas 1502, 1504.

In order to preclude interference between the RF signals of system 1501 and system 1601 the switching control signals 1566, 1568 for system 1501 are generated alternately with signals 1562, 1564 for system 1501. Signals 1566, 1568 are generated during the time interval 500–600 nsec within each period of pulse generator 1560. Thus, by the time each receiver is turned on any reflections of transmitted signals from the other transmitter will have dissipated.

Although omitted from FIG. 15 for clarity, it will be appreciated that the inner doppler signals IRI, IRQ and outer doppler signals ORI, ORQ may be coupled to doppler signal circuits 76, 78 as in FIG. 4. These circuits may then be coupled to the information processor 56 and alarm 58 as further shown in FIG. 4.

While there have been shown and described above various arrangements of area surveillance systems for the purpose of enabling a person of ordinary skill in the art to make and use the invention, it will be appreciated that the invention is not limited thereto. Accordingly, any modifications, variations or equivalent arrangements within the scope of the attached claims should be considered to be within the scope of the invention.

What is claimed is:

1. A surveillance system for detecting motion of a frequency modulating transponder relative to a surveillance zone, comprising:
   a transmitter generating a first signal at a first frequency;
   a transmitting antenna coupled to receive the first signal and radiate the first signal throughout the surveillance zone;
   first and second receiving antennas disposed in spaced relationship at opposite boundaries of the surveillance zone;
   a first receiver coupled to receive from the first receiving antenna a second signal at a frequency different from the first frequency, the first receiver including a doppler detection circuit coupled to generate an indication of any change in frequency of the second signal;
   a second receiver coupled to receive from the second receiving antenna a third signal at a frequency different from the first frequency, the second receiver including a doppler detection circuit coupled to generate an indication of any change in frequency of the third signal; and
   an information processor coupled to receive the indications of changes in frequency of the second and third signals and to generate in response thereto an alarm indication when the indications of changes in frequency of the second and third signals indicate motion within the surveillance zone in a selected direction.

2. The surveillance system according to claim 1, wherein the doppler detection circuit of the first receiver includes circuitry detecting and indicating both the polarity and magnitude of any change in frequency of the second signal, and wherein the doppler detection circuit of the second receiver includes circuitry detecting and indicating both the polarity and magnitude of any change in frequency of the third signal.

3. The surveillance system according to claim 1, wherein the doppler detection circuit of the first receiver is a quadrature phase, dual signal detection circuit indicating any change in frequency of the second signal by generating two quadrature phase doppler frequency signals indicating the polarity of any change in frequency of the second signal by the relative phase relationship thereof and the doppler detection circuit of the second receiver is a quadrature phase, dual signal detection circuit indicating any change in frequency of the third signal by generating two quadrature phase doppler frequency signals indicating the polarity of any change in frequency of the third signal by the relative phase relationship thereof.

4. The surveillance system according to claim 1, further comprising a reference oscillator circuit generating an intermediate frequency demodulating signal, a local oscillator circuit coupled to receive from the transmitter a fourth signal indicative of the phase and frequency of the first signal, the local oscillator circuit being further coupled to receive from the reference oscillator circuit a fifth signal indicative of the phase and frequency of the intermediate frequency demodulating signal and generate a local oscillator signal having a phase and frequency indicative of the difference of the fourth and fifth signals and wherein the first and second receivers each include a first demodulator coupled to frequency shift the second and third signals, respectively, in response to the local oscillator signal to generate respective received intermediate frequency signals having doppler frequency changes in the respective second and third signals superimposed upon a signal having a fixed phase and frequency relationship to the intermediate frequency demodulating signal and a second demodulator coupled to receive the respective received intermediate frequency signal and the intermediate frequency demodulating signal and generate in response thereto doppler frequency signals that are indicative of doppler frequency changes in the respective second and third signals.

5. The surveillance system according to claim 4, wherein each receiver further includes a quadrature phase shifting circuit coupled to receive the intermediate frequency demodulating signal and generate a phase shifted intermediate frequency demodulating signal in response thereto and a third demodulator coupled to receive the respective phase shifted intermediate frequency demodulating signal respective received intermediate frequency signal and generate in response thereto two quadrature phase doppler frequency signals that are indicative of doppler frequency changes in the respective second and third signals and have a phase relationship relative to the respective doppler frequency signals that is indicative of the polarity of any doppler frequency changes in the second and third signals, respectively.

6. A doppler effect surveillance system for detecting motion of a frequency modulating transponder relative to a surveillance zone comprising:
a transmitter generating a first signal at a first frequency;
a transmitting antenna coupled to receive the first signal and radiate the first signal throughout the passageway;
first and second receiving antennas disposed in spaced relationship at opposite ends of the surveillance zone;
a first receiver coupled to receive from the first receiving antenna a second signal at a frequency different from the first frequency, the first receiver including a phase shifting doppler detection circuit coupled to generate a first pair of out-of-phase doppler frequency dependent signals indicative of a direction of motion of the transponder relative to the first antenna;
a second receiver coupled to receive from the second receiving antenna a third signal at a frequency different from the first frequency, the second receiver including a phase shifting doppler detection circuit coupled to generate a second pair of out-of-phase doppler frequency dependent signals indicative of a direction of motion of the transponder relative to the second antenna; and
an information processor coupled to receive the first and second pairs of out-of-phase doppler frequency dependent signals and to generate in response thereto an alarm indication when motion of the transponder in the surveillance zone between the first and second receiving antennas is indicated thereby.

7. The surveillance system according to claim 6, wherein the information processor is further responsive to the direction of motion of a transponder within the surveillance zone to generate the alarm indication only when the transponder is moving toward the first receiving antenna and away from the second receiving antenna.

8. A frequency coherent doppler effect surveillance system for detecting motion of a frequency changing transponder relative to a surveillance zone comprising:
a transmitting system coupled to radiate the surveillance zone with a transmitted signal, the transmitting system including a modulator coupled to receive a carrier signal and a modulating signal and to generate the transmitted signal as a double sideband suppressed carrier amplitude modulated signal in response thereto;
a stable carrier oscillator coupled to generate the carrier signal at a first predetermined frequency;
a coherent signal generating circuit including (A) a reference frequency generating circuit including (A1) a stable oscillator circuit coupled to generate a master frequency reference signal at a second frequency and including (A2) a modulating signal generator circuit coupled to generate the modulating signal at a third predetermined frequency with a fixed phase and frequency relationship to the master frequency reference signal, (A3) an intermediate frequency signal generator coupled to generate an intermediate frequency signal at a fourth predetermined frequency with a fixed phase and frequency relationship to the master frequency reference signal, and (A4) a half intermediate frequency generator coupled to generate a half intermediate frequency signal at a fifth predetermined frequency equal to half the fourth frequency and with a fixed phase and frequency relationship to the master frequency reference signal and (B) a local oscillator signal generating circuit coupled to receive the carrier signal and the half intermediate frequency signal and generate a local oscillator signal that has a fixed phase relationship to the half intermediate frequency signal and a sixth frequency equal to the difference between the second and fifth frequencies;

a receiving system including inner and outer receiving antennas disposed on opposite ends of the surveillance zone to receive from a transponder within the zone inner and outer receiver antenna signals at a seventh frequency equal to the sum of the two double sideband components, the transmitted signal and a doppler frequency that is representative of motion of the transponder within the zone, an inner directional motion detection receiver coupled to receive the inner receiver antenna signal, the local oscillator signal and the intermediate frequency signal and to generate in response thereto inner motion information indicative of a velocity and direction of motion of the transponder relative to the inner receiving antenna, and an outer directional motion detection receiver coupled to receive the outer receiver antenna signal, the local oscillator signal, and the intermediate frequency signal and to generate in response thereto outer motion information indicative of a velocity and direction of motion of the transponder relative to the outer receiving antenna; and an information processor coupled to receive and process the inner and outer motion information to generate an indicator signal when the inner and outer motion information indicates motion of the transponder in opposite directions relative to the inner and outer receiving antennas.

9. The surveillance system according to claim 8, wherein the local oscillator signal generating circuit comprises a phase locked loop including a controlled oscillator generating the local oscillator signal, a phase locked loop modulator coupled to receive the carrier signal from the carrier oscillator and the local oscillator signal and generate a half-intermediate frequency difference signal equal to the difference therebetween, and a phase detector coupled to receive and compare the half-intermediate frequency signal and the difference signal and to control the controlled oscillator in accordance with any difference therebetween to tend to reduce the difference.

10. A frequency coherent doppler effect surveillance system for detecting motion of a frequency changing transponder relative to a surveillance zone comprising:

means for radiating the zone with a transmitted signal;

first means for receiving a received signal having a frequency different from and related to the transmitted signal, the first receiving means including a first doppler frequency detection circuit coupled to detect the direction and speed of motion of the transponder relative to a first boundary of the zone;

second means for receiving the received signal, the second receiving means including a second doppler frequency detection circuit coupled to detect the direction and speed of motion of the transponder relative to a second boundary of the zone; and means for processing information coupled to receive direction and speed information from the first and second receiving means and process the received information to generate an alarm signal when the received information indicates motion of the transponder toward the first boundary and away from the second boundary.

11. The surveillance system according to claim 10, further comprising a threshold velocity detecting means coupled to inhibit the generation of an alarm signal unless the speed of motion of the transponder exceeds a selected threshold magnitude.

12. The surveillance system according to claim 11, wherein the first and second receiving means each include doppler processing circuitry for detecting a position of the transponder within the surveillance zone wherein the processing means is operable to generate an alarm indication only when the transponder has moved through a predetermined minimum detectable distance.

* * * * *

UNITED STATES PATENT AND TRADEMARK OFFICE
CERTIFICATE OF CORRECTION

PATENT NO. : 4,595,915
DATED : June 17, 1986
INVENTOR(S) : Leo R. Close

It is certified that error appears in the above-identified patent and that said Letters Patent are hereby corrected as shown below:

Column 5, line 38, "repradiating" should read --re-radiating--. Column 10, line 32, begin new paragraph starting at "If the transponder...". Column 13, line 46, "On signals" should read --on signals--. Column 15, line 22, "Johnson" should read --Johnson.--. Column 17, line 52, after "signal" and before "respective" insert --and the--.

Signed and Sealed this

Third Day of March, 1987

Attest:

DONALD J. QUIGG

Attesting Officer

Commissioner of Patents and Trademarks